(12) United States Patent
Ren et al.

(10) Patent No.: US 11,830,366 B2
(45) Date of Patent: *Nov. 28, 2023

(54) USING GEOFENCES TO RESTRICT VEHICLE OPERATION

(71) Applicant: Ford Global Technologies, LLC, Dearborn, MI (US)

(72) Inventors: Xiaoyi Ren, Menlo Park, CA (US); Sakthi Narayanan Balasubramanian, Chennai (IN); Daniel Boccuccia, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 199 days.

This patent is subject to a terminal disclaimer.

(21) Appl. No.: 17/318,404

(22) Filed: May 12, 2021

(65) Prior Publication Data
US 2021/0264792 A1    Aug. 26, 2021

Related U.S. Application Data

(63) Continuation of application No. 16/240,184, filed on Jan. 4, 2019, now Pat. No. 11,037,450.

(51) Int. Cl.
| | | |
|---|---|---|
| G08G 1/00 | (2006.01) | |
| H04W 4/021 | (2018.01) | |
| G05D 1/02 | (2020.01) | |
| B60W 50/12 | (2012.01) | |

(52) U.S. Cl.
CPC ............. *G08G 1/207* (2013.01); *B60W 50/12* (2013.01); *G05D 1/0214* (2013.01); *H04W 4/022* (2013.01); *G05D 2201/0213* (2013.01)

(58) Field of Classification Search
CPC ..... G08G 1/207; B60W 50/12; G05D 1/0214; G05D 2201/0213; H04W 4/022
See application file for complete search history.

(56) References Cited

U.S. PATENT DOCUMENTS

| | | | | |
|---|---|---|---|---|
| 9,924,315 | B1 * | 3/2018 | Cornwall | H04W 4/022 |
| 10,171,940 | B1 * | 1/2019 | Greenberger | H04W 4/027 |
| 10,421,437 | B1 * | 9/2019 | Koskan | G08B 21/0261 |
| 10,433,107 | B1 * | 10/2019 | Zhao | H04W 4/021 |
| 10,497,232 | B1 * | 12/2019 | Koskan | G08B 13/189 |

(Continued)

FOREIGN PATENT DOCUMENTS

WO    WO-2013101205 A1 *   7/2013   ........... G01S 5/0009

*Primary Examiner* — Calvin Cheung
(74) *Attorney, Agent, or Firm* — David R. Stevens; Stevens Law Group

(57) ABSTRACT

The present invention extends to methods, systems, and computer program products for using geofences to restrict vehicle operation. Aspects of the invention include creating dynamic geofences and limiting vehicle movements (e.g., speed, acceleration, steering, etc.) within and in the vicinity of the dynamic geofences to protect pedestrians from physical harm. In general, radio devices track people in an area by counting the number of devices and calculating the number of people based on average number of devices per person. Using count and location data, a geofence is created when population or population density within an area exceeds a threshold. The geofence can be sent to vehicles to restrict vehicle operation, for example, slowing down or stopping the vehicle, within and around the geofence.

12 Claims, 6 Drawing Sheets

(56) References Cited

U.S. PATENT DOCUMENTS

| | | | |
|---|---|---|---|
| 2012/0008526 A1* | 1/2012 | Borghei | H04W 4/021 370/254 |
| 2015/0148077 A1* | 5/2015 | Jelle | H04W 4/022 455/456.3 |
| 2017/0118592 A1* | 4/2017 | Patel | H04W 60/00 |
| 2019/0164081 A1* | 5/2019 | Deluca | H04L 63/107 |
| 2019/0261131 A1* | 8/2019 | Keil | H04W 4/022 |
| 2020/0065840 A1* | 2/2020 | Pinel | H04W 4/02 |

* cited by examiner

USING GEOFENCES TO RESTRICT VEHICLE OPERATION

CROSS-REFERENCE TO RELATED APPLICATIONS

The present application is a continuation of U.S. patent application Ser. No. 16/240,184 entitled "Using Geofences To Restrict Vehicle Operation", filed on Jan. 4, 2019, which is incorporated by reference in its entirety.

BACKGROUND

1. Field of the Invention

This invention relates generally to the field of vehicle operation, and, more particularly, to using geofences to restrict vehicle operation.

2. Related Art

It is dangerous for pedestrians, especially for those in a crowd of pedestrians, when motor vehicles are operating in close proximity to the pedestrians. Due to differences in mass and speed, a pedestrian can be significantly injured or killed in a collision with a motor vehicle. In confined spaces, such as, narrow and/or crowded streets, chances of pedestrian-vehicle collisions increase.

BRIEF DESCRIPTION OF THE DRAWINGS

The specific features, aspects and advantages of the present invention will become better understood with regard to the following description and accompanying drawings where.

DETAILED DESCRIPTION

Figure 1:
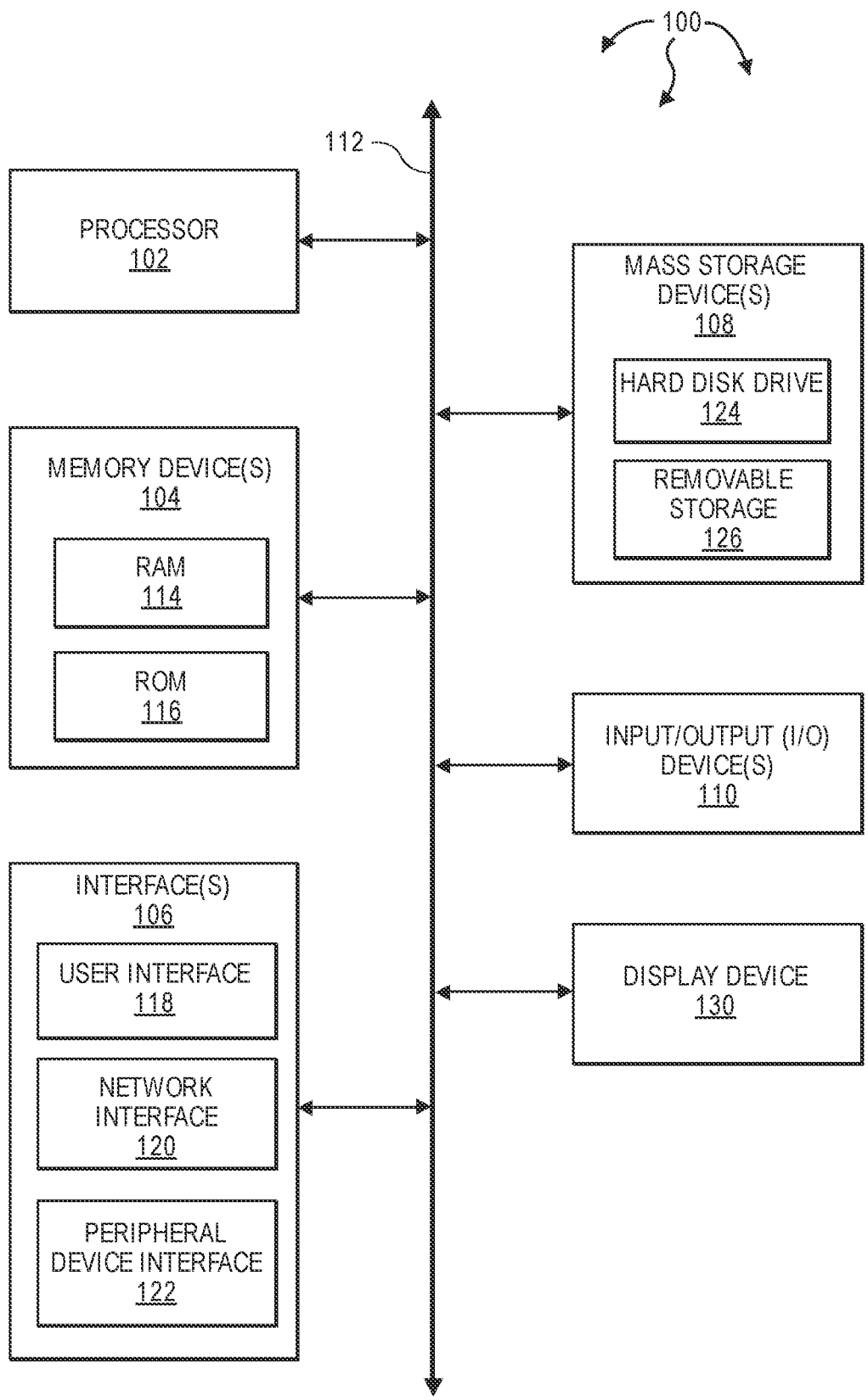
FIG. 1 illustrates an example block diagram of a computing device.

The present invention extends to methods, systems, and computer program products for using geofences to restrict vehicle operation.

There have been incidents where drivers, for whatever reason, whether it be loss of vehicle control, driver distraction, or other such reasons, drive into crowds. These incidents often occur when drivers are either elderly or inexperienced teenagers. However, vehicles have also been used to carry out terrorist attacks in crowded areas where a driver has intentionally driven a vehicle into pedestrians. When drivers drive erratically in a crowded area or with ill-intention, it is very easy to injure or kill many people.

Aspects of the invention include creating dynamic geofences and limiting vehicle movements (e.g., speed, acceleration, steering, etc.) within and in the vicinity of the dynamic geofences. In general, radio devices track people in an area by counting the number of devices and calculating the number of people based on average number of devices per person.

Base stations can locate personal (e.g., radio) devices (e.g., mobile phones, smart watches, other wearables, etc.) via GPS, wireless radio communication (e.g., Bluetooth, Wi-Fi, etc.), etc. to get an estimate of the total number of devices in an area as well as locations of the devices. Using count and location data, a geofence is created when population or population density within an area exceeds a threshold. New boundaries can be generated in realtime as people move around creating a dynamic geofence. The geometry of a geofence can be a simple shape (e.g., circular, elliptical) or more complex organic shapes based on device locations. The boundary of a geofence can grow and/or shrink based on a variety of factors, including density of people in an area, a known public event, known physical barriers, etc.

A geofence is defined as a protective zone within which people receive protective services from vehicles. A person can be within a geofence if their device is counted and contributes to the definition and construction of the protective zone. People without devices are also protected if they are within a group of other people whose device locations are used to create the protective zone. As such, not having device does not preclude a person from being protected (i.e., there is a herd immunity aspect).

In one aspect, one or more base stations transmit device totals and device locations to a cloud-based service on an ongoing basis. The cloud-based service calculates and re-calculates geofence boundaries from the device totals and device locations. The cloud-based service can maintain a set of active geofences. As new sets of device totals and device locations are received new geofences can be created. As device totals and device locations in an existing geofence decrease, the existing geofence boundary can be reduced. Geofences that lack sufficient numbers of devices (and thus are no longer representative of a crowd) can be deleted.

A geofence can be calculated by counting the number of devices in an area and estimating the number of people in the area (i.e., crowd density) based on an average number of devices per person. Data from multiple base stations can be aggregated and used in geofence calculations.

In general, connected vehicles in proximity to, within, or entering a geofence can have operations restricted. Geofences can vary in intensity with the intensity of a geofence being based on crowd density. Restrictions placed on vehicle operation within a geofence (and possibly also within some vicinity around the geofence) can be tailored (e.g., set or matched) to the geofence intensity. Operations at vehicles in proximity to, within, or entering less intense geofences can be less restricted. On the other hand, operations at vehicles in proximity to, within, or entering more intense geofences can be more restricted.

In one aspect, geofence intensity corresponds to crowd density. Less dense crowds can be protected by less intense geofences. One the other hand, more dense crowds can be protected by more intense geofences.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2A:
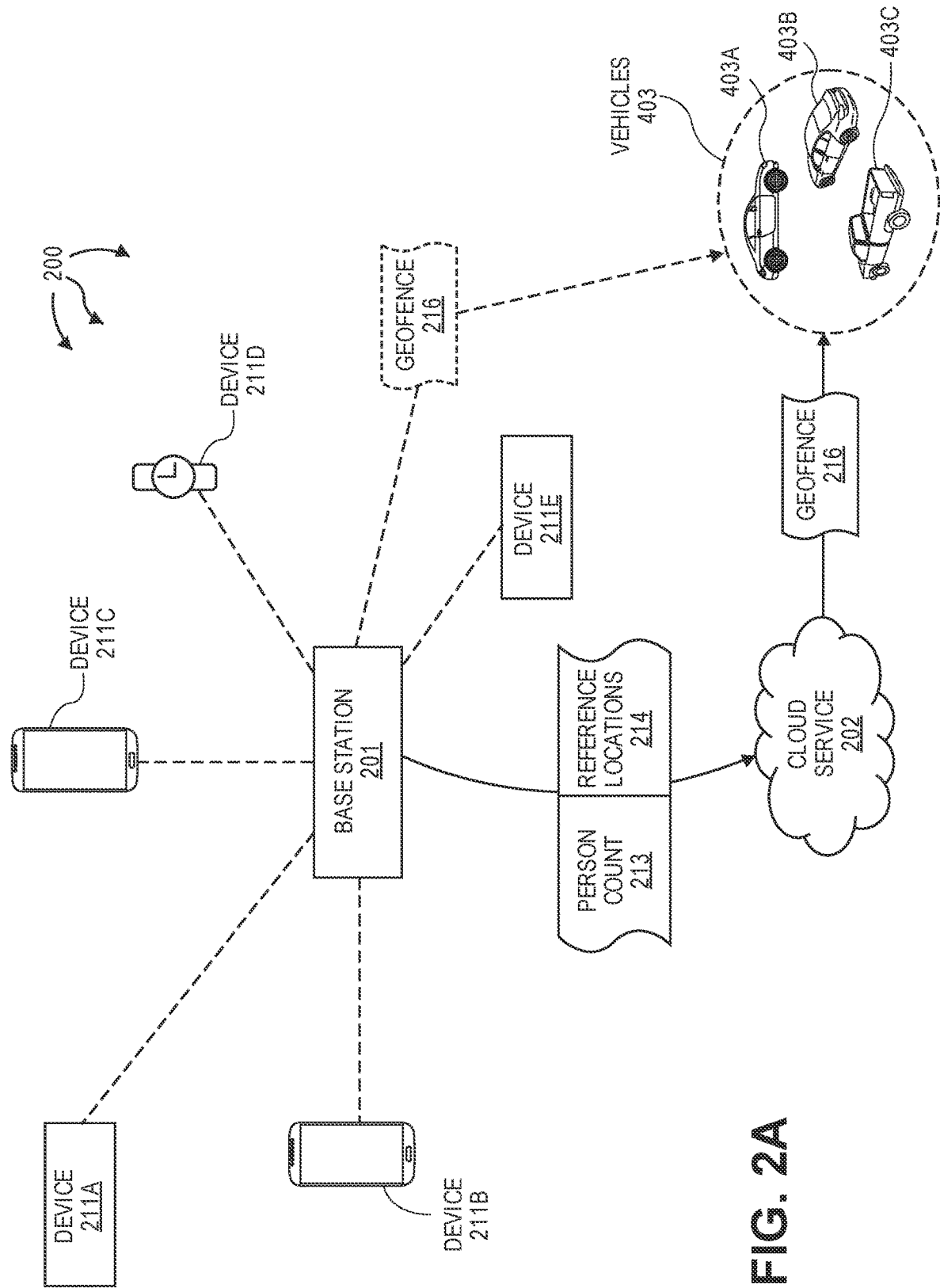
FIG. 2A illustrates an example environment that facilitates creating geofences.

FIG. 2 illustrates an example environment 200 that facilitates creating a geofence. As depicted, computer architecture 200 includes base station 201, cloud service 202, vehicles 403 (including vehicles 403A, 403B, and 403C), and devices 211A-211E.

Each of devices 211A-211E can be a mobile electronic device, such as, for example, a smartphone, a smartwatch, a laptop, or other carriable or wearable device. Other carriable or wearable devices can include devices handed out at an event, such as, a badge, a sticker or other keepsake. A badge, a sticker or other keepsake can include electronic components and may additionally serve as a souvenir from the event or a means of advertising etc. Each of devices 211A-211E can wirelessly communicate with base station 201, such as, for example, via one or more of: Wi-Fi, Bluetooth, or other wireless protocols.

In one aspect, base station 201 considers multiple devices within a specified range of each other (e.g., 20 cm) to be associated with the same person. Calculating person counts can take into account multiple devices considered to be associated with the same person.

Base station 201 can scan for devices over different communication protocols and different frequencies. Based on characteristics of wireless communication (e.g., signal strength, range, direction, frequency, etc.) with each mobile electronic device, base station 201 can calculate the number of persons and reference locations in an area. The person count is an estimated total count of people within range of base station 201. Base station 201 can determine device locations, including distance and direction from base station 201, Global Position System (GPS) coordinates, etc. From device locations, base station 201 can derive a reference location for each person. Base station 201 can track the movement of people (e.g., through communication with mobile electronic devices) in an area to facilitate geofence creation and geofence changes.

In one aspect, base station 201 sends the person count and reference locations to cloud service 202. Cloud service 202 creates a geofence from the person count and reference locations. Cloud service 202 can send the geofence to vehicles 403. In general, modules at vehicles 403 can restrict movement of vehicles 403 based on vehicle location in proximity to a geo fence. The boundary geometry of a geofence can be a simple shape (e.g., circular, elliptical, etc.) or more complex organic shapes based on device locations.

In one aspect, cloud service 202 is a transportation mobility cloud capable of communication with base stations, vehicles, law enforcement, emergency services, etc.

In general, the boundary geometry of a geofence can extend around people located within a specified range, for example, 20-30 meters, from base station 201. The boundary geometry of a geofence can be updated in essentially real time as people move.

Figure 3:
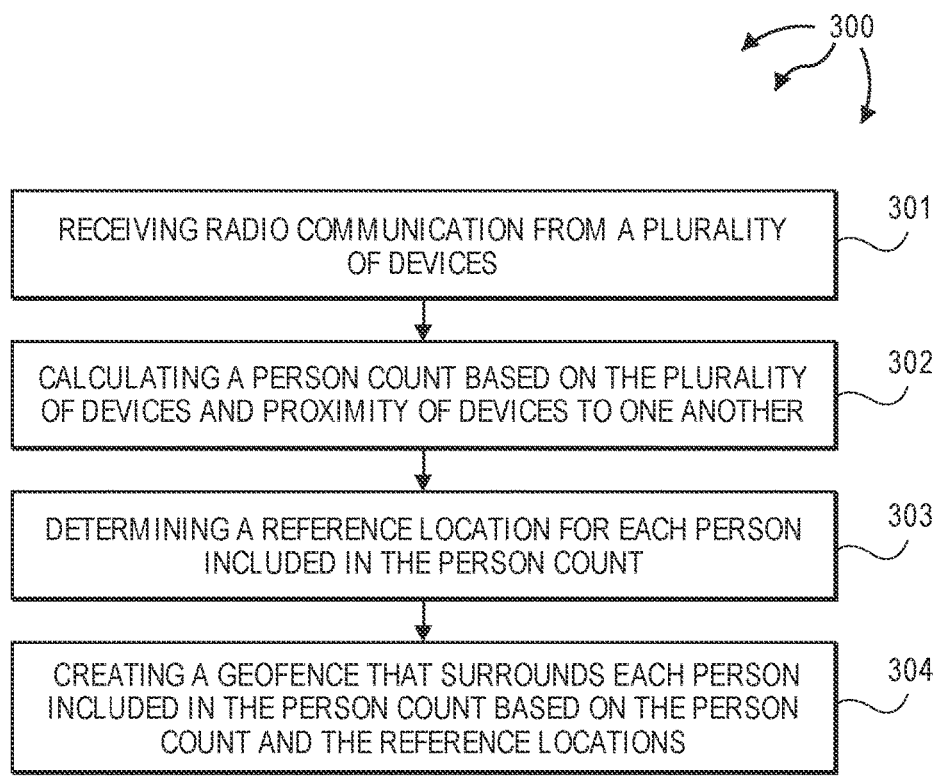
FIG. 3 illustrates a flow chart of an example method for creating a geofence.

FIG. 3 illustrates a flow chart of an example method 300 for creating a geofence. Method 300 will be described with respect to the components and data in environment 200.

Method 300 includes receiving radio communication from a plurality of devices (301). For example, base station 201 can receive radio communication from each of devices 211A-211E. Method 300 includes calculating a person count based on the plurality of devices and proximity of the plurality of devices to one another (302). For example, base station 201 can calculate person count 213 estimating the number of people associated with devices 211A-211E. Base station 201 can consider any devices detected within a specified distance of one another (e.g., 20 cm) to be carried/worn by the same person. Thus, an estimate of people in an area (or crowd density) can be based on an average number of devices per person.

Method 300 includes determining a reference location for each person included in the person count (303). For example, base station 201 can determine reference locations 214 relative to base station 201 for each person included in person count 213. Method 300 includes creating a geofence that surrounds each person included in the person count based on the person count and the reference locations (304).

In one aspect, base station 201 sends person count 213 and reference locations 214 to cloud service 202. Cloud service 202 creates geofence 216 around the people carrying and/or wearing devices 211A-211E from person count 213 and reference locations 214. In another aspect, base station 201 creates geofence 216 from person count 213 and reference locations 214.

Method 300 can also include notifying one or more vehicles of the geofence. For example, cloud service 202 can notify vehicles 403 about geofence 216. Alternately, base station 201 can notify vehicles 403 about geofence 216. The boundary geometry of geofence 216 can be a simple shape (e.g., circular, elliptical, etc.) or more complex organic shapes based on locations of devices 211A-211E.

Figure 2B:
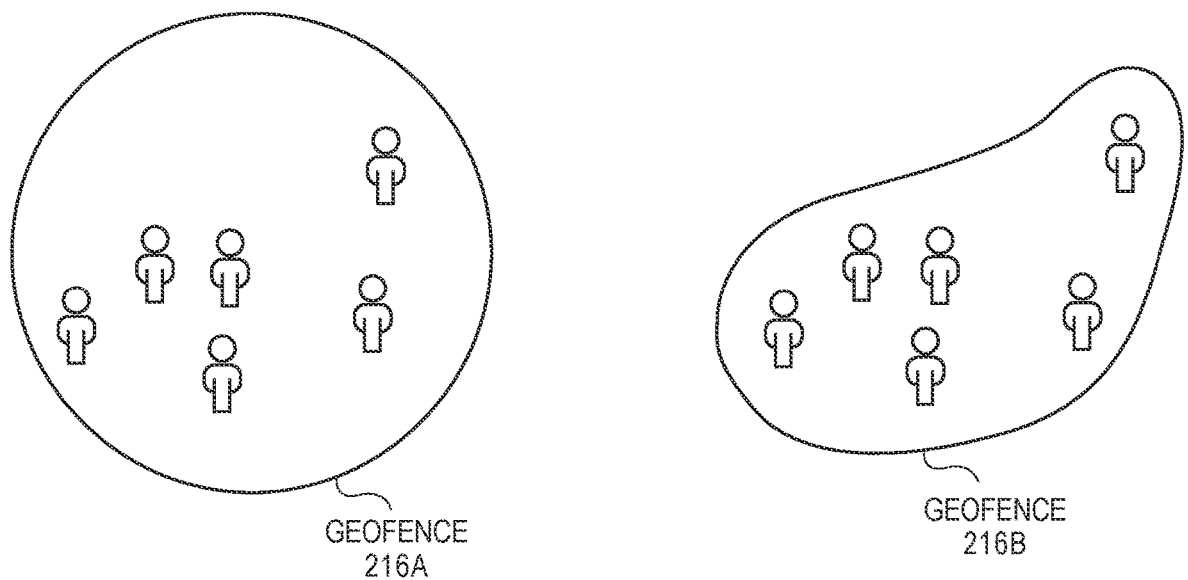
FIG. 2B illustrates example geofences.

FIG. 2B illustrates example geofences 216A and 216B. Geofence 216 can take the shape of geofence 216A or geofence 216B.

Further, devices 211A-211E can continually communicate with base station 201 as people carrying and/or wearing devices 211A-211E move around. Base station 201 can continually re-calculate person count 213 and reference locations 214. As person count 213 and reference locations 214 change, base station 201 can generate a new boundary for geofence 216. Alternately, base station 201 can send person count 213 and reference locations 214 to cloud service 202. As person count 213 and reference locations 214 change, cloud service 202 can generate a new boundary for geofence 216. Thus, base station 201 or cloud service 202 can change the boundary of geofence 216 dynamically and essentially in real time as people move around. The boundary of geofence 216 can grow, shrink, change shape, etc.

Base station 201 or cloud service 202 can dynamically shrink, grow, or change the boundary geometry of geofence 216 based on a variety of factors, including but not limited to: location inside/outside of buildings, density of people, a known public event. Density criteria can be defined, for example, as one person in a circle of diameter 3 m. A known public event can be registered with a city, such as, for example, a sporting event, an entertainment event, a social or political rally, etc. In one aspect, a city (or other governmental entity) can set up a default geofence centered on an event venue. Details of the geofence can be configured and managed via a dedicated application by an event organizer.

Base station 201 or cloud service 202 can also adjust the intensity of geofence 216 as crowd density in an area changes. If crowd density decreases, geofence intensity can be correspondingly lowered. On the other hand, if crowd density increases, geofence intensity can be correspondingly raised.

Figure 4:
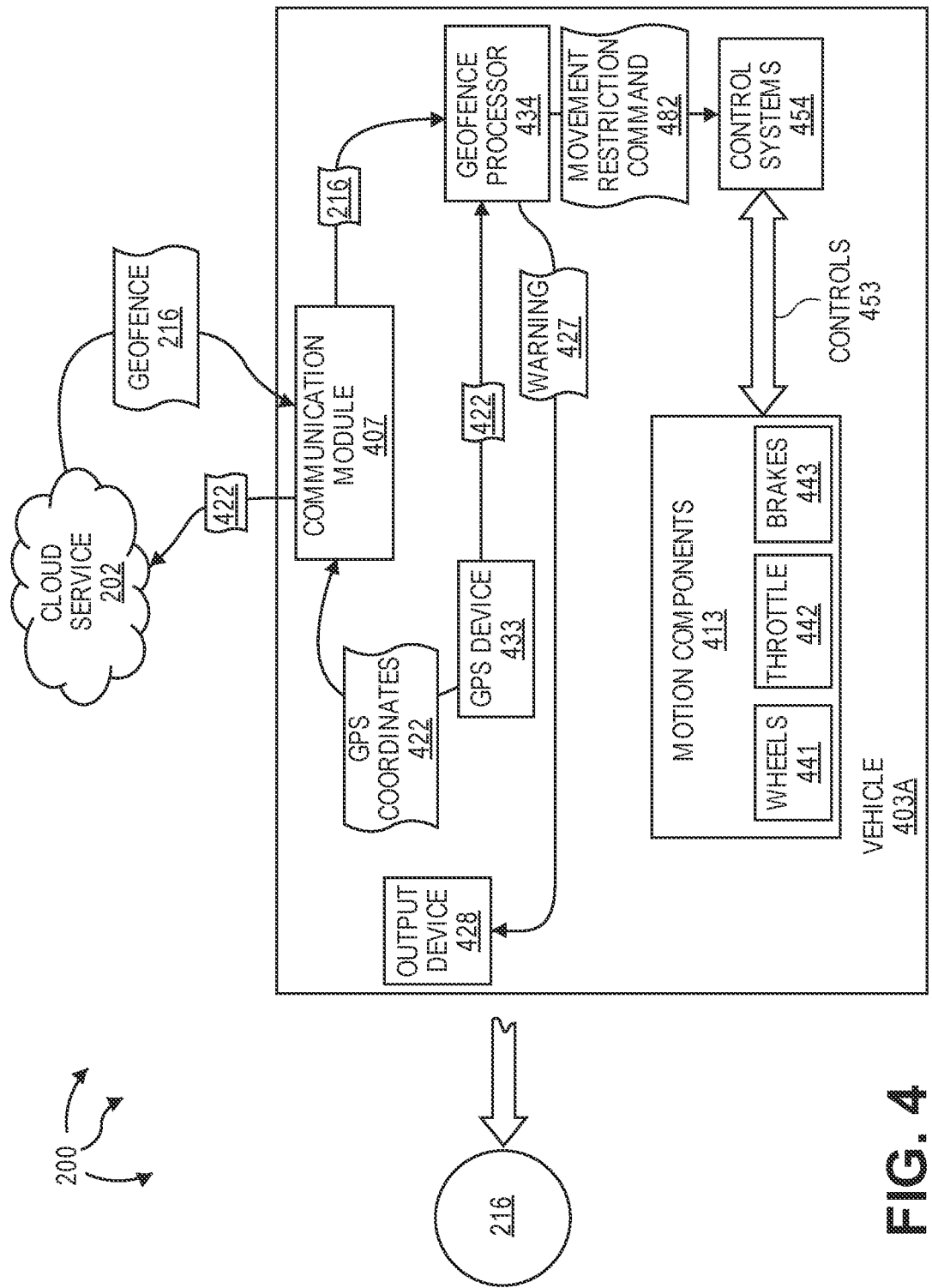
FIG. 4 illustrates an example vehicle configured to have operations restricted when in proximity to a geofence.

FIG. 4 illustrates an example vehicle 403A configured to have operations restricted when in or within proximity to a geofence. Vehicle 403A can be a land-based vehicle, such as, for example, a car, a van, a truck, a motorcycle, a bus, etc. Vehicle 403A can include various components, such as, for example, tires, wheels, brakes, throttle, engine, steering wheel, etc., to facilitate operation on roadways. Vehicle 403A can be autonomous and/or human operated. Computerized components at vehicle 403A can be configured to restrict motion of vehicle 403A under specified circumstances, such as, when vehicle 403A is within a geofence or in proximity of a geofence.

Environment 200 may be and/or include interconnected portions of: a roadway, an intersection, a parking lot, a bike path, a trail, a pedestrian walkway, a cross walk, a sidewalk, etc. Vehicle 403A can move within environment 200 to navigate from an origin to a destination in environment 200.

As depicted vehicle 403A includes communication module 407, motion components 413, output device 428, GPS device 433, geofence processor 434, and vehicle control systems 454. Each of communication module 407, motion components 413, output device 428, GPS device 433, geofence processor 434, and control systems 454, as well as their respective components can be connected to one another over (or be part of) a network, such as, for example, a PAN, a LAN, a WAN, a controller area network (CAN) bus, and even the Internet. Accordingly, each of communication module 407, motion components 413, output device 428, GPS device 433, geofence processor 434, and control systems 454, as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Output device 428 can include one or more of: a display screen, a speaker, a tactile element, etc. that outputs massages, warnings, notifications, etc. to occupants of vehicle 403A. Other components at vehicle 403A can send massages, warnings, notifications, etc. to output device 428. Output device 428 presents the massages, warnings, notifications, etc. to vehicle occupants.

GPS device 433 is configured to calculate the GPS coordinates of vehicle 403A. GPS device 433 can send GPS coordinates to other modules at vehicle 403A, including communication module 407 and geofence processor 434. In other aspects, modules at vehicle 403A can determine the location of vehicle 403A in other ways. In these other aspects, other types of location data can be sent to modules at vehicle 403A, including communication module 407.

Communication module 407 is configured to communicate with other objects, such as, vehicles (e.g., vehicle-to-vehicle communication) or other computer systems, such as, cloud service 202, (e.g., vehicle-to-infrastructure communication). Thus, vehicle 403A can be considered a "connected vehicle." Communication module 407 can send the GPS coordinates of vehicle 403A (or other location data) to cloud service 202.

Based on the GPS coordinates (or other location data), cloud service 202 identify any geofences in the vicinity of vehicle 403A. Cloud service 202 can send identified geofences to communication module 407. Communication module 407 can receive geofences from cloud service 202. Communication module 407 can send geofences to geofence processor 434.

In general, vehicle control systems 454 include an integrated set of control systems for controlling movement of vehicle 403A (possibly autonomously). For example, vehicle control systems 454 can include a throttle control system to control throttle 442, a steering system to control wheels 441, a collision avoidance system to control brakes 443, etc. Vehicle control systems 454 can receive input from other components of vehicle 403A (including geofence processor 434). Based on received input, vehicle control systems 454 can send automated controls 453 to motion components 413 to control (e.g., restrict) movement of vehicle 403A.

For example, geofence processor 434 can process a received geofence in view of the current location of vehicle 403 to determine if movement of vehicle 403 is to be restricted. If movement restriction is appropriate, geofence processor 434 can send a movement restriction command to vehicle control systems 454. Vehicle control systems 454 can send corresponding automated controls 453 to motion components 413 to cause vehicle 403A to brake, slow down, turn, etc., in order to safely navigate within or around a geofence.

Figure 5:
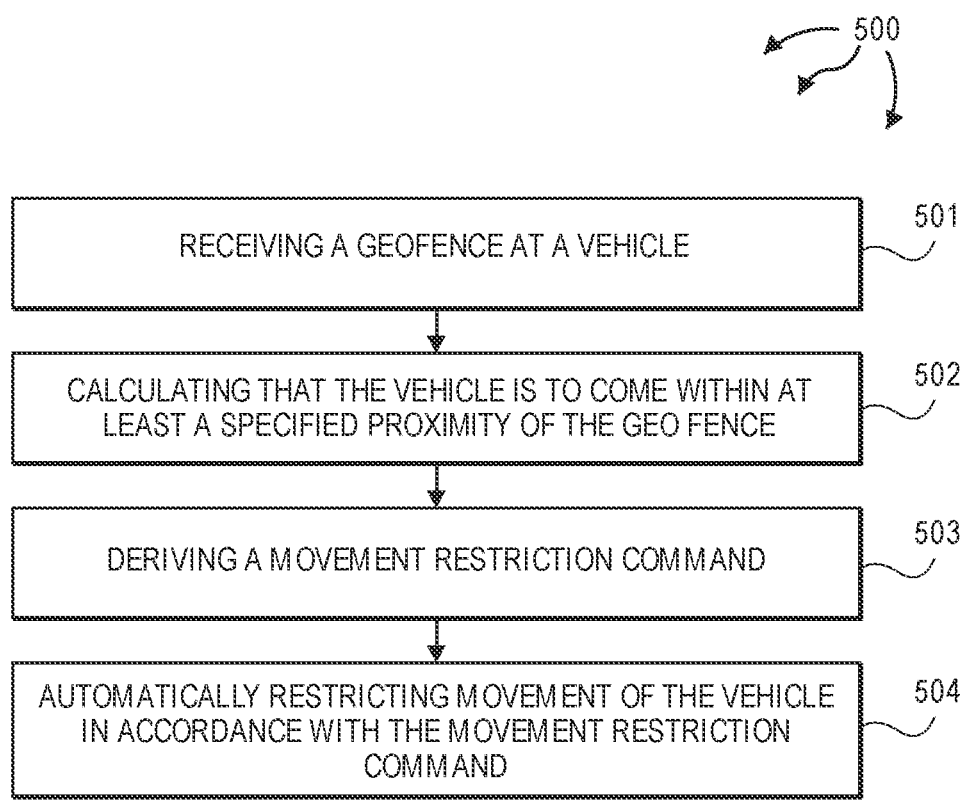
FIG. 5 illustrates a flow chart of an example method for restricting movement of a vehicle in response to notification of a geofence.

FIG. 5 illustrates a flow chart 500 of an example method for restricting movement of a vehicle in response to notification of a geofence. Method 500 will be described with respect to the components and data in environment 200.

During operation of vehicle 403A, GPS device 433 can calculate GPS coordinates 422 representing the location of vehicle 403A. GPS device 433 can send GPS coordinates 422 to communication module 407 and to geofence processor 434. Communication module 407 can send GPS coordinates 422 to cloud service 202. Based on GPS coordinates 422, cloud service 202 can determine that vehicle 403A is approaching and/or is in the vicinity of geofence 216. Alternately, cloud service 202 can determine that geofence 216 is approaching vehicle 403A (e.g., as a group of people move) or that vehicle 403A was in geofence 216 when geofence 216 was created (e.g., if a crowd forms near or around vehicle 403A). In response, cloud service 202 can send geofence 216 to vehicle 403A. Cloud service 202 can continually re-send geofence 216 to vehicle 403A as geofence 216 evolves, for example, as geofence 226 moves, as the boundary geometry of geofence 216 changes, as intensity is adjusted, etc.

Method 500 includes receiving a geofence at a vehicle (501). For example, communication module 407 can receive geofence 216 from cloud service 202. Communication module 407 can send geofence 216 to geofence processor 434. Method 500 includes calculating that the vehicle is to come within at least a specified proximity of the geofence (502). For example, based on GPS coordinates 422, movement characteristics of vehicle 403A, the location of geofence 216, movement characteristics of geofence 216, and the boundary geometry of geofence 216, geofence processor 434 can calculate that vehicle 403A is to come at least within a specified proximity of geofence 216. Other movement characteristics of vehicle 403A can include direction, speed, and acceleration.

Method 500 includes deriving a movement restriction command (503). For example, geofence processor 434 can derive movement restriction command 482 based on characteristics of geofence 216 (e.g., location, movement, boundary geometry, intensity, etc.). Movement restriction command 482 can define how the movement of vehicle 403A is to be restricted for safe operation around people (pedestrians) protected by geofence 216. Method 500 includes automatically restricting movement of the vehicle in accordance with the movement restriction command (504). For example, geofence processor 434 can send movement restriction command 482 to control systems 454. In response, control systems 454 can automatically send controls 453 to motion components 413 to implement the motion restrictive intent of movement restriction command 482. For example, control systems 454 can send controls 403 to turn wheels 441, reduce throttle 442, apply brakes 443, etc. (or some combination thereof). As such, the potential for vehicle 403A to injure or kill a person in geofence 216 is significantly reduced or entirely eliminated.

In one aspect, a geofence defines a geofence intensity. Movement restriction command 482 can be more or less restrictive based on the geofence intensity. As such, the geofence intensity is essentially defined as a measure of the response level to any vehicles within or in proximity to the geofence. Geofence intensity can vary and can correspond to crowd density.

Figure 6:
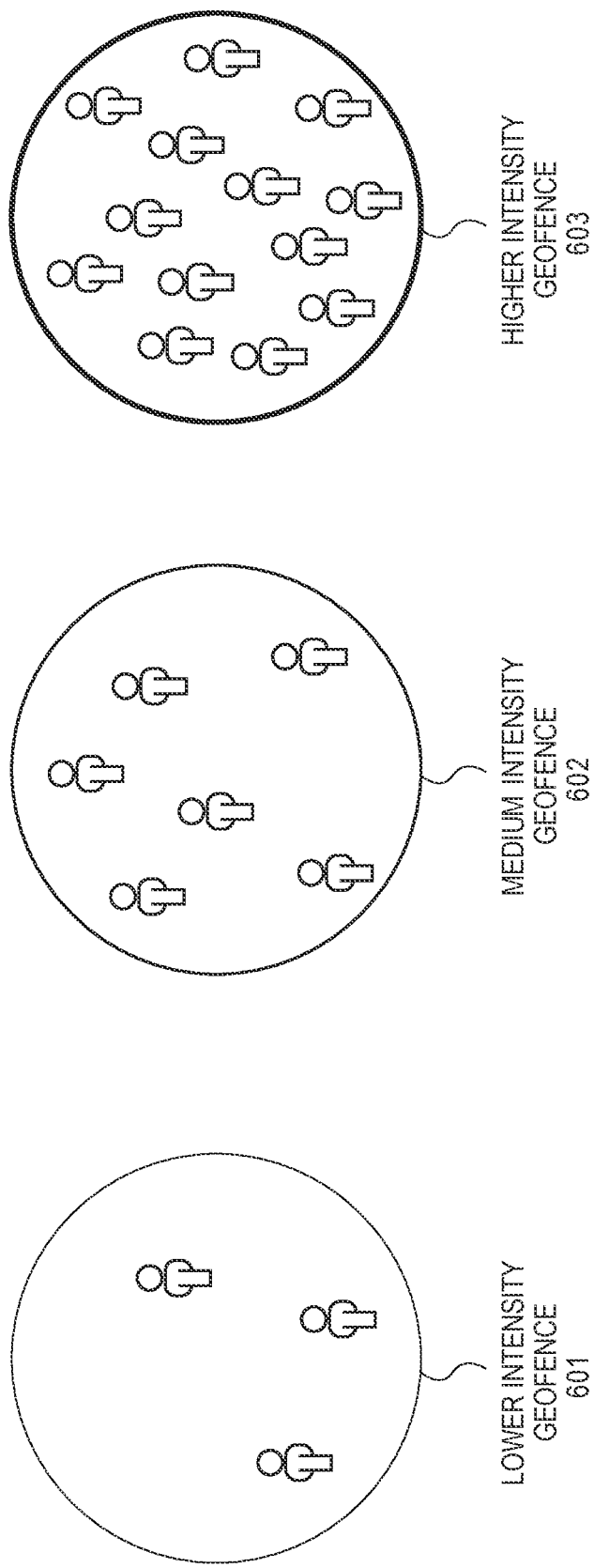
FIG. 6 illustrates example geofences of different intensities.

FIG. 6 illustrates example geofences of different intensities. As depicted, FIG. 6 includes lower intensity geofence 601 (reduced person density), medium intensity geofence 602 (moderate person density), and higher intensity geofence 603 (increased person density). When a vehicle approaches lower intensity geofence 601 (or vice versa), vehicle occupants can be given a warning (e.g., audible, visual, tactile, etc.). A movement restriction command can force the vehicle to slow down to a graduated maximum speed. The graduated maximum speed can be lowered as the vehicle gets closer to the lower intensity geofence. For example, within 100 m vehicle speed restricted to 10 kph, within 50 m speed restricted to 5 kph, etc.

Thus, if geofence 216 is a lower intensity geofence, geofence processor 434 can send warning 427 to output device 428. Output device 428 can output waning 427 to warn occupants of vehicle 403A about geofence 216. Movement restriction command 482 can force vehicle 403A to slow down to a graduated maximum speed. The graduated maximum speed can be lowered as vehicle 403A and geofence 416 get closer together.

When a vehicle approaches medium intensity geofence 602 (or vice versa), vehicle occupants can be given a warning (e.g., audible, visual, tactile, etc.). A movement restriction command can force the vehicle to a stop completely at a pre-determined distance from geofence 602. The vehicle is prevented from moving, except away from geofence 602 or must wait until geofence 602 moves away.

Thus, if geofence 216 is a medium intensity geofence, geofence 434 processor can send warning 427 to output device 428. Output device 428 can output waning 427 to warn occupants of vehicle 403A about geofence 216. Movement restriction command 482 can force vehicle 403A to stop completely at a pre-determined distance from geofence 216. Vehicle 403A is prevented from moving, except away from geofence 216 or must wait until geofence 216 moves away.

When a vehicle approaches higher intensity geofence 603 (or vice versa), occupants of the vehicle can be given a warning (e.g., audible, visual, tactile, etc.). A movement restriction command can force the vehicle to a stop completely at a pre-determined distance from geofence 603. Concurrently, a cloud service or the vehicle can notify authorities, such as, law enforcement or emergency services. The vehicle is prevented from moving until cleared by authorities.

Thus, if geofence 216 is a higher intensity geofence, geofence 434 processor can send warning 427 to output device 428. Output device 428 can output waning 427 to warn occupants of vehicle about geofence 216. Movement restriction command 482 can force vehicle 403A to a stop completely at a pre-determined distance from geofence 216. Concurrently, cloud service 202 and/or vehicle 403A can notify authorities, such as, law enforcement or emergency services. Vehicle 403A is prevented from moving until cleared by authorities.

In some aspects, a base station creates multiple geofences. The geo fences can be overlapping or non-overlapping. When geofences overlap, a person can be protected by two or more geofences. For example, a base station can detect one group of people in one direction and another group of people in another direction. If the groups are a threshold distance apart, the base station can consider the groups as separate and create two separate geofences. If the groups are not the threshold distance apart, the base station considers the groups to be the same group and creates a single larger geofence. The base station can also merge and split geofences as different groups move closer to or further away from another respectively.

Two intersecting geofences can be treated as separate and overlapping geofences. When intersecting geofences intersect by a requisite overlap (e.g., 50% of one geofence overlaps with the other geofence), the geofences can be merged. For example, groups in distinct geofences can move towards one another. When the geofences have requisite overlap, the base station can merge the geofences.

Similarly, when different portions of a geofence have requisite separation, the geofence can be split into multiple geofences. For example, two distinct groups within an geofence may continue to move towards different edges of a geofence (even as the geofence updates in essentially real time). As the groups move further apart, they may eventually be the threshold distance apart. Upon reaching the threshold distance, the base station can consider the groups as separate and split the geofence into multiple geo fences. The threshold distance for forming different geo fences and the threshold distance for splitting a geofence can be the same distance or a different distance.

Different overlapping or non-overlapping geofences can have the same or different intensities and/or have more or less restrictive restrictions. When geofences overlap, people within the overlap can be provided protection according to the geofence with most restrictive restrictions among the overlapping geo fences.

In other aspects, multiple base stations communicate with one another including exchanging person counts and reference locations with one another. Through interoperation, the base stations can create geofences that span across multiple base station coverage areas. The multiple base stations can also interoperate to merge different geofences into one larger geofence or split a larger geofence into multiple different and smaller geofences.

If a further aspect, one base station or multiple base stations merely gather person counts and reference locations and send the person counts and reference locations to a cloud service (e.g., cloud service 202). The cloud service then determines if different groups of people are to be protected by different geofences or protected by the same geofence. The cloud service can form overlapping as well as non-overlapping geofences. The cloud service can also merge geofences and split geofences as different groups move closer to or further away from another respectively. The cloud service can use mechanisms similar to those described for base stations when forming, merging, splitting, or deleting geofences.

Hybrid arrangements are also possible. For example, a base station or multiple base stations can interoperate to create and manage geofences. The geofences can be sent to the cloud service for distribution, refinement, etc. In one aspect, the cloud service may have additional knowledge, for example, related to planned events, building locations, physical barriers, etc. that is unavailable to base stations. The cloud service can be use the additional knowledge to refine geofences received from base stations.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, mobile device radio communication, person counts, reference locations, geofences, geofence intensities, geofence boundary geometry, GPS coordinates, vehicle occupant warnings, movement restriction commands, motion component controls, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, mobile device radio communication, person counts, reference locations, geofences, geofence intensities, geofence boundary geometry, GPS coordinates, vehicle occupant warnings, movement restriction commands, motion component controls, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices.

When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications, variations, and combinations are possible in light of the above teaching. Further, it should be noted that any or all of the aforementioned alternate implementations may be used in any combination desired to form additional hybrid implementations of the disclosure.

What is claimed:

1. A system comprising one or more processors configured to execute instructions stored in non-transitory computer readable storage medium, the instructions comprising:
   receiving radio communication from a plurality of devices;
   grouping a first person and a second person in a group of people based on a proximity of the plurality of devices to one another;
   calculating a quantity of people within the group of people;
   calculating a first reference location associated with the first person;
   calculating a second reference location associated with the second person; and
   adjusting a geofence boundary configuration of a geofence surrounding the group of people based on the quantity of people within the group of people, the first reference location, and the second reference location.

2. The system of claim 1, wherein the instructions further comprise determining a proximity of the plurality of devices to one another based on the radio communication.

3. The system of claim 1, wherein the instructions are such that adjusting the geofence boundary configuration comprises adjusting a geometry of the geofence.

4. The system of claim 1, wherein the instructions are such that adjusting the geofence boundary configuration comprises adjusting an intensity of the geofence.

5. The system of claim 1, wherein the instructions further comprise:
   determining a density of people within in area to be protected by the geofence; and
   determining a geofence intensity based on the density of people; and
   wherein the instructions are such that adjusting the geofence boundary configuration comprises setting an intensity of the geofence surrounding the group of people to the determined geofence intensity.

6. The system of claim 1, wherein the instructions further comprise notifying a vehicle about the geofence surrounding the group of people.

7. The system of claim 1, wherein the instructions further comprise:

receiving additional radio communication from another plurality of devices subsequent to adjusting the geofence boundary configuration;

determining the proximity of the other plurality of devices to one another based on the additional radio communication;

recalculating the quantity of people in the group of people based on the proximity of the other plurality of devices to one another;

recalculating the first reference location associated with the first person;

recalculating the second reference location associated with the second person;

again adjusting the geofence boundary configuration based on the recalculating quantity of people in the group of people, the recalculated first reference location, and the recalculated second reference location.

8. A system comprising one or more processors configured to execute instructions stored in non-transitory computer readable storage medium, the instructions comprising:

receiving radio communication from a plurality of devices;

grouping a first person and a second person in a group of people based on a proximity of the plurality of devices to one another;

calculating a quantity of people within the group of people;

calculating a first reference location associated with the first person;

calculating a second reference location associated with the second person; and determining a geofence intensity based on the quantity of people within the group and an area to be protected by a geofence, wherein the area is determined based on the first reference location and the second reference location; and generating the geofence comprising the determined geofence intensity for the area.

9. The system of claim 8, wherein the instructions further comprise determining a proximity of the plurality of devices to one another from the radio communication.

10. The system of claim 8, wherein the instructions are such that generating the geofence comprises generating the geofence with an elliptical boundary geometry.

11. The system of claim 8, wherein the instructions further comprise notifying a vehicle about the geofence and the determined geofence intensity.

12. The system of claim 8, wherein the instructions further comprise:

receiving additional radio communication from another plurality of devices subsequent to generating the geofence;

determining the proximity of the other plurality of devices to one another based on the additional radio communication;

recalculating the quantity of people in the group of people based on the proximity of the other plurality of devices to one another;

recalculating the first reference location associated with the first person;

recalculating the second reference location associated with the second person;

determining a new geofence intensity based on changed people density within the area; and adjusting the geofence boundary to the new geofence intensity.

* * * * *